(12) United States Patent
Ito et al.

(10) Patent No.: US 6,343,751 B1
(45) Date of Patent: *Feb. 5, 2002

(54) ELECTROMAGNETIC FUEL INJECTION VALVE

(75) Inventors: Hideki Ito; Seiji Ii; Hiroshi Kawazoe; Toshiro Makimura, all of Obu (JP)

(73) Assignee: Aisan Kogyo Kabushiki Kaisha, Obu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/510,523

(22) Filed: Feb. 22, 2000

(30) Foreign Application Priority Data

Feb. 23, 1999 (JP) ............................ 11-045217
Feb. 24, 1999 (JP) ............................ 11-046983

(51) Int. Cl.[7] ............................................. F02M 51/00
(52) U.S. Cl. ............................ 239/585.4; 239/585.1
(58) Field of Search ..................... 239/585.4, 585.3, 239/585.1, 533.9; 251/129.21, 129.16, 129.15

(56) References Cited

U.S. PATENT DOCUMENTS

| 4,597,558 A | * | 7/1986 | Hafner et al. | 239/585.3 X |
| 5,086,980 A | * | 2/1992 | Hickey | 239/585.3 |
| 5,240,227 A | * | 8/1993 | Sich | 251/129.16 |
| 5,374,029 A | * | 12/1994 | Bailey | 251/129.16 |
| 5,427,352 A | * | 6/1995 | Brehm | 251/129.16 X |
| 5,447,288 A | * | 9/1995 | Keuerleber et al. | 251/129.16 X |

FOREIGN PATENT DOCUMENTS

| JP | 04031662 | 2/1992 |
| JP | 08061152 | 3/1996 |
| JP | 11148438 | 6/1999 |

OTHER PUBLICATIONS

Claims of Ser. No. 09/507,921.

* cited by examiner

Primary Examiner—Lesley D. Morris
(74) Attorney, Agent, or Firm—Dennison, Scheiner, Schultz & Wakeman

(57) ABSTRACT

A fuel injection port 21 formed in a seat 20 is opened and closed by a movable valve 14 supported by a flat spring 16. The movable valve 14 is biased by an elastic force of a coil spring 26 in a direction that closes the fuel injection port 21. When electric power is supplied to a solenoid coil 4, the movable valve 14 is moved to a direction that opens the fuel injection port 21 as a result of an electromagnetic attraction force between a magnetic circuit M for generating an electromagnetic attraction force and the movable valve 14. Air gaps G0, G1 and G2 are formed within the fuel injection port and permeance ratios between the air gaps may be set to optimal valves.

19 Claims, 9 Drawing Sheets

ELECTROMAGNETIC FUEL INJECTION VALVE

BACKGROUND OF THE INVENTION

1. Field of the Invention

The present invention relates to electromagnetic fuel injection valves, and particularly, to electromagnetic fuel injection valves suitable for use with a gaseous fuel such as compressed natural gas fuel or similar fuels.

2. Description of the Related Art

A known fuel injection value using electromagnetic force has been disclosed m Japanese Laid-Open Patent Publication No. 4-31662. In this fuel injection valve, a movable valve for opening and closing a fuel injection port is supported by a flat spring. The movable valve is usually biased to close the fuel injection port (valve closing direction) by the elastic force of a coil spring. In this state, when electric power is supplied to a solenoid coil, the movable valve moves in a direction (valve opening direction) that opens the fuel injection port as a result of the electromagnetic attraction force.

In the known fuel injection valve, a magnetic circuit for generating the electromagnetic attraction force has two air gaps between the movable valve and a magnetic circuit-forming member. In this fuel injection valve, the amount of the electromagnetic attraction force that is generated is proportional to the area of the movable valve surface that faces each air gap and to the area of the surface of the magnetic circuit forming member. Therefore, in order to improve the operating response of the movable valve, the area of the movable valve surface that faces the air gap and the area of the magnetic circuit forming member surface must be increased so as to increase the electromagnetic attraction force.

However, if the movable valve surface and the magnetic circuit forming member surface are increased, the size of the fuel injection valve will also increase. Because the fuel injection valve is mounted to an engine, it is not preferable to increase the size of the fuel injection valve. Moreover, because the supply voltage (valve operating voltage) that must be applied to the solenoid coil in order to move the movable valve also must increase in order to increase the electromagnetic attraction force, the generation efficiency of electromagnetic attraction force is reduced.

Furthermore, in the known fuel injection valve of Japanese Laid-Open Patent Publication No. 4-31662, the flat spring comes in metal contact with the movable valve. Thus, the flat spring and the movable valve will rub against each other when the movable valve performs the valve opening and closing operation. For this reason, the movable valve and the flat spring are quickly worn and the durability of the valve is reduced.

In order to prevent the movable valve and the flat spring from being worn, the flat spring can be fixed to the movable valve. However, when the flat spring is fixed to the movable valve, stress is applied to the flat spring when the movable valve performs the valve opening and closing operation. When the applied stress is large, a weak portion of the flat spring may break. For this reason as well, the durability of the known electromagnetic valve is reduced.

SUMMARY OF THE INVENTION

Accordingly, it is one object of the present invention to teach improved electromagnetic fuel injector valves.

In one aspect of the present teachings, an electromagnetic valve is taught that generates an electromagnetic attraction force acting on a movable valve by magnetic circuit having air gaps. The dimensions of the air gaps are selected in order to reduce the valve operating voltage, thereby improving the valve operating performance and permitting the size of the valves to be minimized.

In another asp, a moveable valve and flat spring are taught that reduce or prevent the possibility of unnecessary wear on the fuel injection valve, which is used to open and close the fuel injection port An elastic member may be disposed between the movable valve and the flat spring to reduce wear on the flat spring. Thus, it is possible to make a fuel injection valve that has high durability.

Other objects features and advantages of the present invention will be readily understood after reading the following detailed description together with the accompanying drawings and the claims.

DETAILED DESCRIPTION OF THE INVENTION

Figure 1:
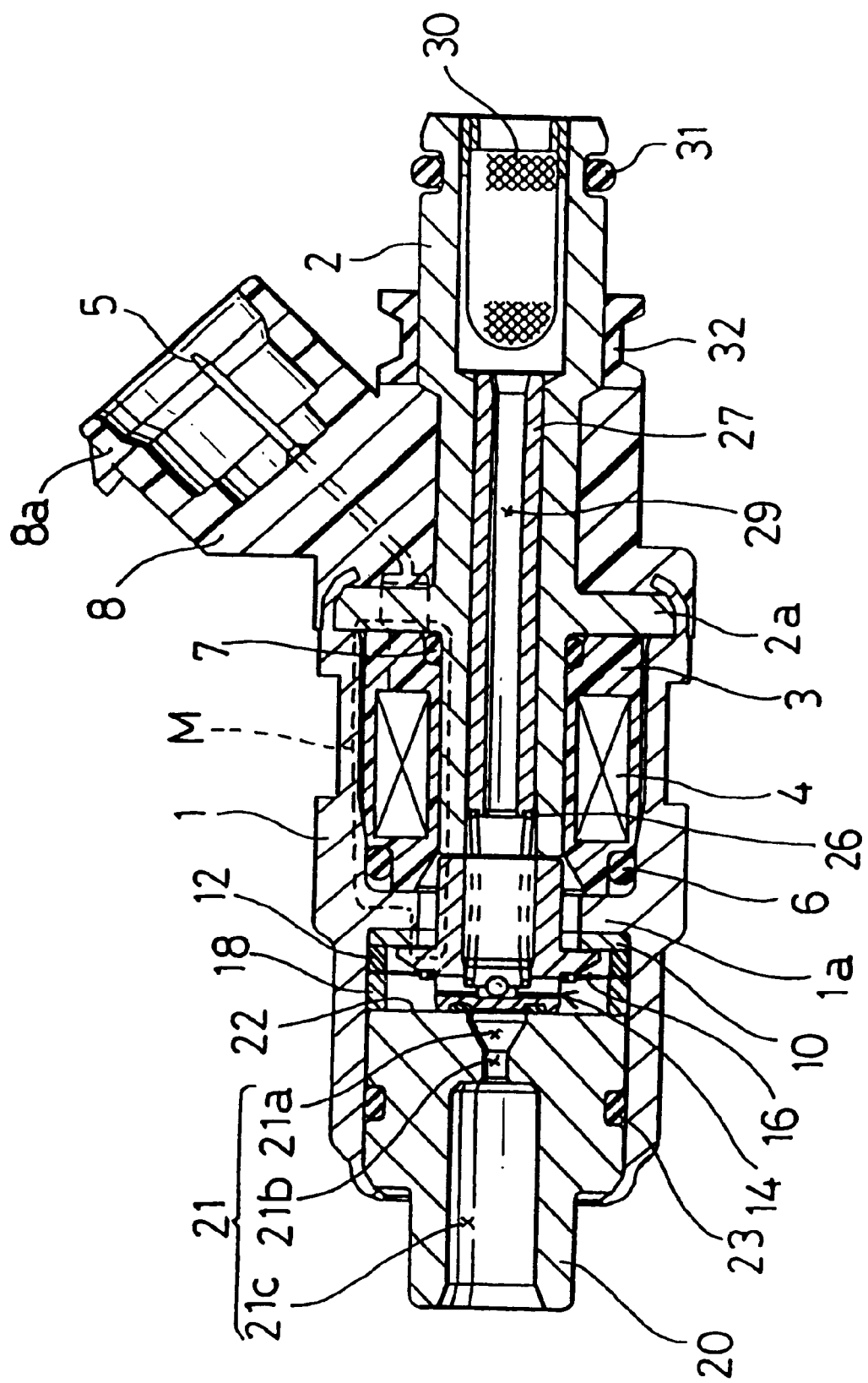
FIG. 1 is a cross sectional view showing an improved fuel injection valve.

In one aspect of the present teachings, an elastic member may be interposed between the movable valve for opening and closing a fuel injection port and a flat spring supporting the movable valve. As a result, it is possible to avoid metal contact between the movable valve and the flat spring and wear on the movable valve and/or the flat spring can be reduced or prevented. Moreover, when the movable valve performs the opening and closing operation, stress applied from the movable valve to the flat spring is reduced by elastic deformation of the elastic member. Thus, it is possible to reduce or prevent the possibility of flat spring breakage. The elastic member preferably may be attached to either the movable valve or the flat spring If the elastic member is attached to either the movable valve or the flat spring, the elastic member preferably is attached by insertion molding, so as to cover an edge portion of a first hole formed either in the movable valve or the flat spring, Moreover, in such an embodiment, the other of the movable valve and the flat spring preferably is attached to a second hole formed in the elastic member by interference fit According to this construction, the attachment is performed by interference fit as a result of elastic deformation of the elastic member, so that the attaching work can be readily performed If the elastic member is susceptible to hardening at low temperatures, the stress that is applied to the flat spring will increase and the flat spring can be easily broken in low temperature environments For this reason, the elastic member preferably comprises an elastic material having excellent low temperature characteristics. That is, the elastic member should remain elastic and pliable even at low temperatures to prevent hardening of the elastic member in order to reduce or prevent the possibility that the flat spring will break in low temperature environments. Appropriate elastic materials are known in the art and a representative list of such appropriate elastic materials includes, but is not limited to, perfluorbased (fluoro) rubbets, perfluoroether-based (fluoro) rubbers, fuorosilicone rubbers, hydrogenated NBRs (nitrilbutadiene butadiene rubber) and similar materials.

If the flat spring comprises a material having fatigue-resistant characteristics, it is possible to improve the durability of the flat spring itself; and therefore, to prevent the flat spring from being broken. Appropriate materials having fatigue-resistant characteristics are known in the art and one representative example of such a material is precipitation hardened stainless steel.

Another aspect of the present teachings concerns the use of air gaps with the electromagnetic valve. Air gaps have a "permeance" value in a magnetic circuit. If the permeance value of the air gaps are set to appropriate values according to the present teachings, the valve operating voltage may be reduced, thereby increasing the efficiency of the electromagnetic attraction force generating circuit.

Optionally, a magnetic circuit for generating an electromagnetic force to act on the movable valve may include a first magnetic circuit forming member and a second magnetic circit-forming member. Preferably, the fist magnetic circuit forming member faces the movable valve and the second magnetic forming member faces the moving direction of the movable valve. Preferably, a first air gap and a second air gap are formed between the movable valve and these members. In first and second magnetic chit forming members, the second air gap is formed so as to be positioned outside a diametrical direction of the movable valve with respect to the first air gap. A ratio (P2/P1) of the permeance P1 of the first air gap to the permeance P2 of the second air gap preferably may be set within a range of about 1.5 to about 2.1. By utilizing such an embodiment the valve operating voltage can be reduced with respect to known electromagnetic valves, thereby improving the efficiency of the electromagnetic attraction force generating circuit. Consequently, the electromagnetic valve can be militarized and the operating response of the movable valve can be improved.

An optional third air gap may be formed between the movable valve and the facing magnetic circuit-forming member in the diametrical direction of the movable valve. In this case, the ratio (P0/P1) of the permeance P0 of the third air gap to the permeance P1 of the first air gap preferably may be set within a range of about 0.55 to about 0.9. In such case, the valve operating voltage may be further reduced, thereby enabling further miniaturization of the electromagnetic valve and further improvements in the operating response of the movable valve.

Optionally, the first magnetic circuit-forming member comprises a coil wound around a core. The second magnetic circuit-forming member may optionally comprise a stopper for blocking the movement of the movable valve and defining a valve opening position.

If the movable valve is supported by a flat spring, as described above, the valve operating voltage can be further reduced. In such case, the present teachings are particularly appropriate for a small-size fuel injection valve that requires a high operating response of the movable valve.

Each of the additional features and constructions disclosed above and below may be utilized separately or in conjunction with other features and constructions to provide improved electromagnetic fuel injection valves and methods for designing and using such electromagnetic fuel injection valves. Detailed representative examples of the present invention, which examples utilize many of these additional features and constructions in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

FIG. 1 is a cross sectional view showing an improved electromagnetic fuel injection valve. In this representative embodiment, the electromagnetic fuel injection valve is preferable utilized with a gaseous fuel, such as, but not limited to, compressed natural gas or similar fuels.

A substantially cylindrical body 1 comprises a magnetic material and has an annular flange portion 1a that projects inwardly in a perpendicular direction from the core 2 at the central portion of the core 2. A substantially cylindrical core 2 is inserted into a rear end portion (right side in FIG. 1) of the body 1 and has an annular flange portion 2a that projects outwardly in a perpendicular direction from the core 2 at the central portion of the core 2. The rear end portion (end portion on the right side in FIG. 1) of the body 1 is fastened to the flange portion 2a, thereby attaching the core 2 to the body 1.

A bobbin 3 is preferably interposed between the body 1 and the core 2. The bobbin 3 may be formed of an electrically insulating material, such as a synthetic resin or a similar material, and a solenoid coil 4 is wound around the bobbin 3 in a multi-layer manner. The solenoid coil 4 is electrically connected to a terminal 5 that projects rearwardly at an angle from the core 2. The terminal 5 goes through the flange portion 2a of the core 2. A front end portion (end portion on the left side in FIG. 1) of the bobbin 3 has, at its outer periphery, a ring-like shaped front-side O-ring 6 for sealing the space between the bobbin 3 and the body 1. Moreover, a rear end portion of the bobbin 3 has, at its outer periphery, a ring-like shaped rear-side O-ring 7 for sealing the space between the bobbin 3 and the core 2.

A connector 8 may be disposed at the rear end portion of the core 2 and can be formed by resin molding the connector 8 to the outer periphery of the core 2. The connector 8 preferably has a socket portion 8 that surrounds the distal end portion of the terminal 5. In this particular embodiment, the socket 8a connects a power supply (not shown) to the solenoid coil 4, which power supply may be controlled by an electronic control unit (not shown).

A stopper 10, a collar 12, a flat spring 16 attached to a movable valve 14, a ring 18 and a seat 20 may be successively incorporated onto the front end portion of the body 1 (left side in FIG. 1). The seat 20, stopper 10, collar 12, ring 18, movable valve 14 and flat spring 16 will be sequentially described below.

The seat 20 may be formed, for example, from stainless steel, and preferably a bearing surface 22 is formed on the rear end face of the seat 20. A fuel injection port 21 is defined within the axial central portion of the seat 20 and preferably includes a tapered hole portion 21a having a diameter that gradually becomes smaller from its rear end face toward the front side (left side of FIG. 1), a small-diameter hole portion 21b that continuously extends to the front end of the tapered hole portion 21a and a large-diameter portion 21c that continuously extends to the front end of the small-diameter hole portion 21b via a stepped face (not numbered).

The body 1 may be fastened to a stepped portion formed on an outer periphery of the seat 20, thereby attaching the seat 20 to the body 1. Consequently, the stopper 10, the collar 12, an outer periphery of the flat spring 16 and the ring 18 are held between the flange portion 1a of the body 1 and the seat 20. In this case, a ring-like shaped sealing member 23 is disposed on the central, outer periphery of the seat 20 to seal the space between the seat 20 and the body 1.

Figure 2:
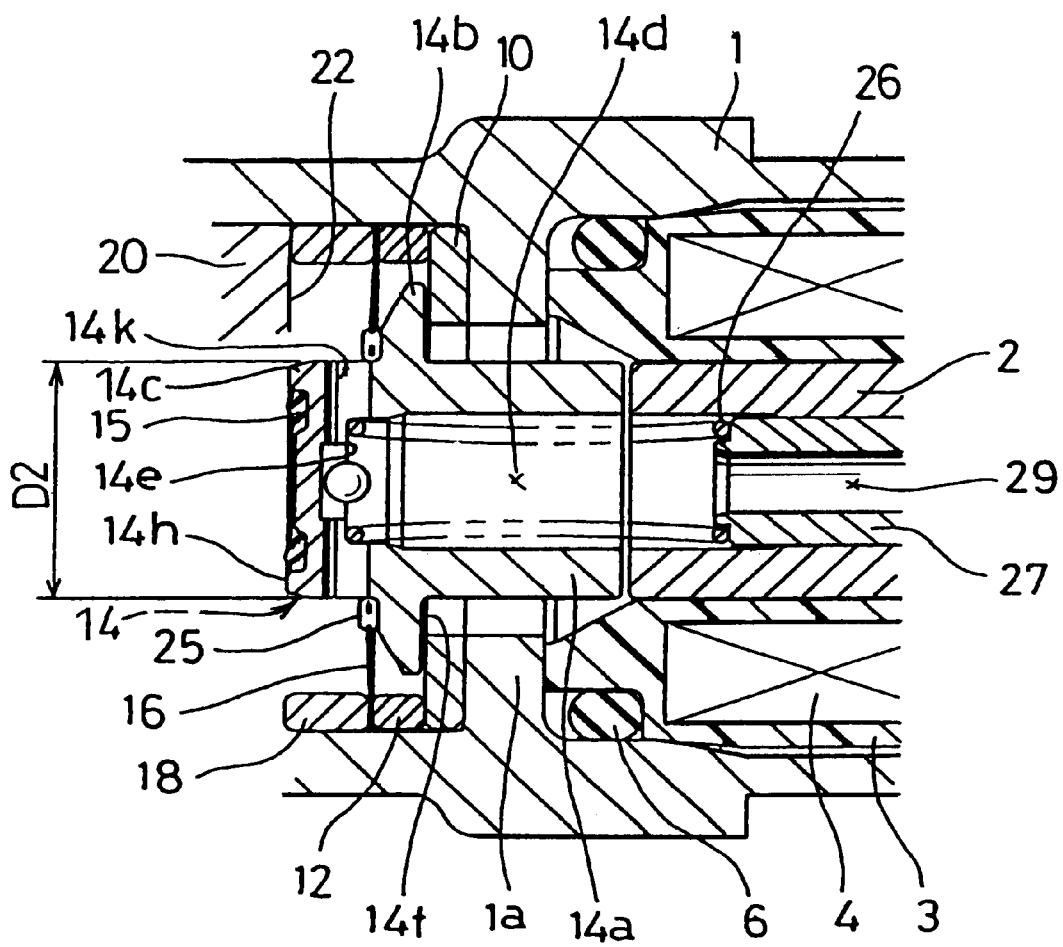
FIG. 2 is an enlarged view showing principal parts of the fuel injection valve shown m FIG. 1.

The stopper 10 can be made, for example, of an electromagnetic stainless steel, which is a magnetic material, and may have a ring plate-like shape. As shown in FIG. 2, the stopper 10 is preferably fitted into the body 1 and contacts the flange portion 1a The collar 12 also can be made, for example, of stainless steel and may have a ring-like shape. As shown in FIG. 2, the collar 12 is preferably fitted into the body 1 and contacts an outer peripheral portion of the stopper 10 and an outer peripheral edge portion of the flat plate 16.

The ring 18 also can be made, for example, of stainless steel and may have a ring-like shape. As shown in FIG. 2, the ring 18 is preferably fitted into the body 1 and contacts the outer peripheral edge portion of the flat plate 16. Further, when the seat 20 is fixed to the body 1, the ring 18 presses the outer peripheral portion of the flat spring 16 against the collar 12. Thus, the outer peripheral edge portion of the flat spring 16 is held between the collar 12 and the ring 18.

The movable valve 14 also can be made, for example, from an electromagnetic stainless steel, which is a magnetic material. As shown in FIG. 2, the movable valve 14 includes a main portion 14a, a flange portion 14b and a valve portion 14c The main portion 14a preferably has a cylindrical shape with substantially the same crosssectional shape as the core 2. The flange portion 14b is formed on a front end portion of the main portion 14a so as project outwardly in perpendicular direction from the main portion 14a. The valve portion 14c extends from the front end portion of the main portion 14a and preferably has a disk shape. In this case, the main portion 14a and the flange portion 14b function together as an armature when current flows to the solenoid coil 4.

A hollow portion 14d of the main portion 14a has a spring bearing surface 14e that comprises a stepped face at its inner peripheral surface. Moreover, a rear surface of the flange portion 14b forms an abutting surface 14f that can contact the stopper 10.

A front face of the valve portion 14c may serve as a contact surface 14h that can contact the bearing surface 22 of the seat 20. The contact surface 14h preferably has an annular groove (not numbered). An elastic annular-formed sealing member 15 can be fitted into the annular groove. Further, when the movable valve 14 is moved toward the valve closing direction, the sealing member 15 contacts the bearing surface 22 of the seat so as to perform sealing and damping (noise absorption) operations.

Further, the valve portion 14c preferably has a plurality (e.g., four) of holes or passages 14k, which communicate with the hollow portion 14d of the main portion 14a and are radially disposed The hollow portion 14d and the holes 14k form a fuel passage (not shown by reference numeral) of the movable valve.

Figure 3:
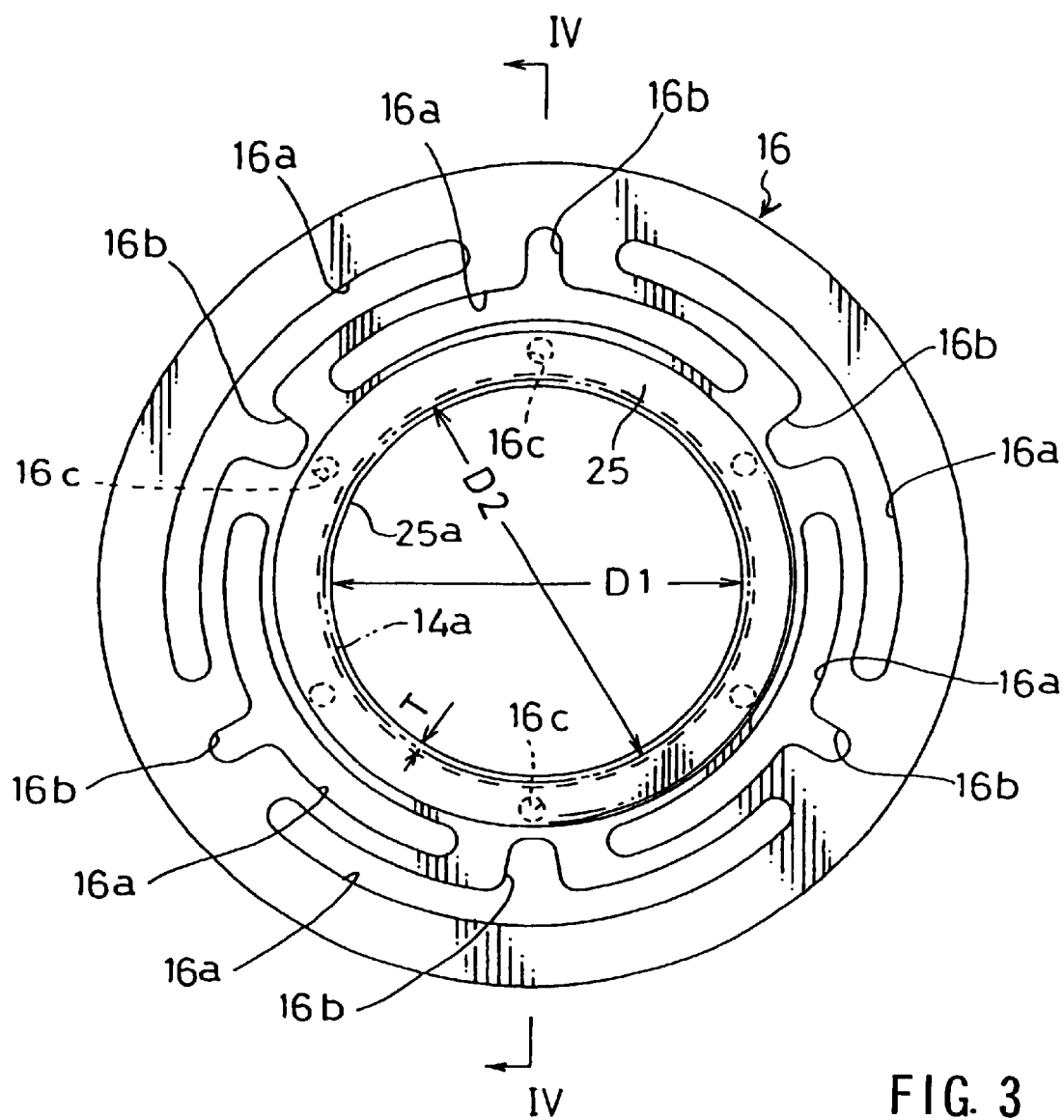
FIG. 3 is a front view showing a flat spring.
Figure 4:
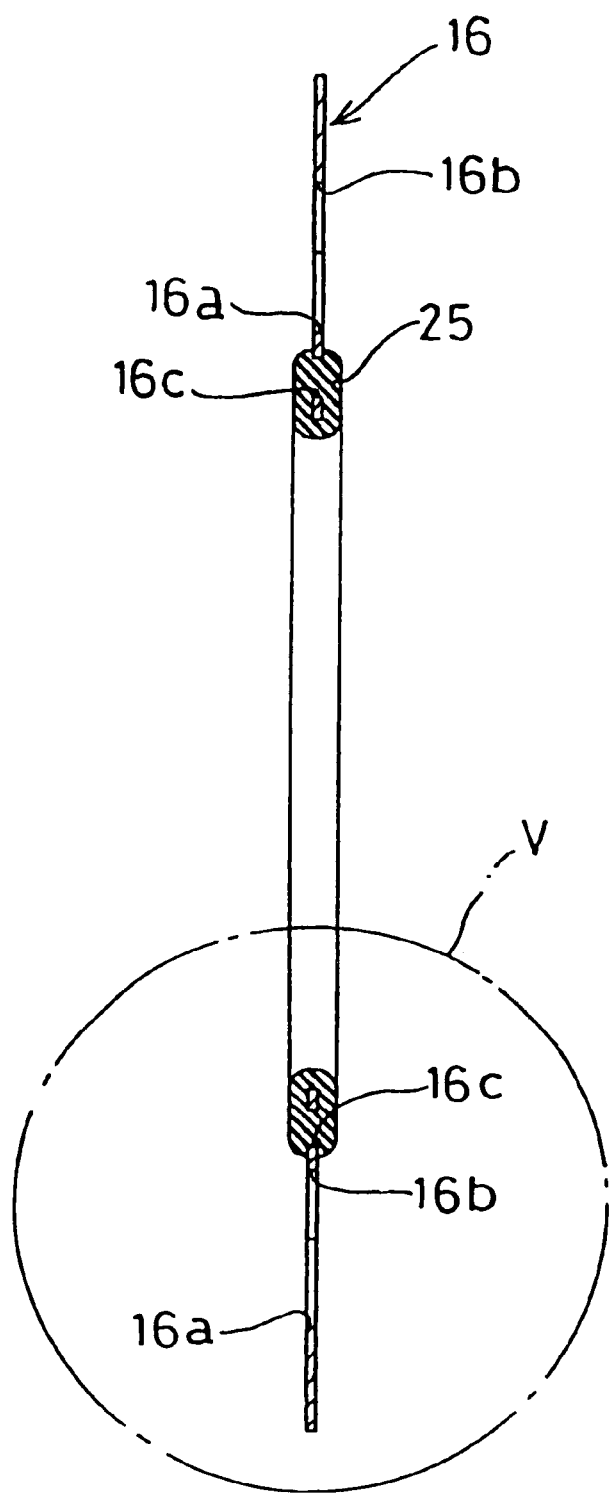
FIG. 4 is a cross sectional view taken along line IV—IV of FIG. 3.

A representative flat spring 16 will now be describe FIG. 3 is a front view of the flat spring 16 and FIG. 4 is a crass sectional view taken along line IV—IV of FIG. 3. The fat spring 16 preferably has a disk shape with three elongated slots 16a on each of inner and outer sides along inner and outer circumferential lines. These inner and outer slots 16a are preferably offset by about ½ pitch. The inner and outer long slots 16a preferably have a concave portion 16b that are positioned in the spaces between the other long slots 16a. As discussed above, the flat spring 16 preferably comprises, for example, a material having fatigue-resistant characteristics, such as a precipitation hardened stainless steel (i.e., SUS631, SUS632J1 or similar stainless steel materials).

Figure 5:
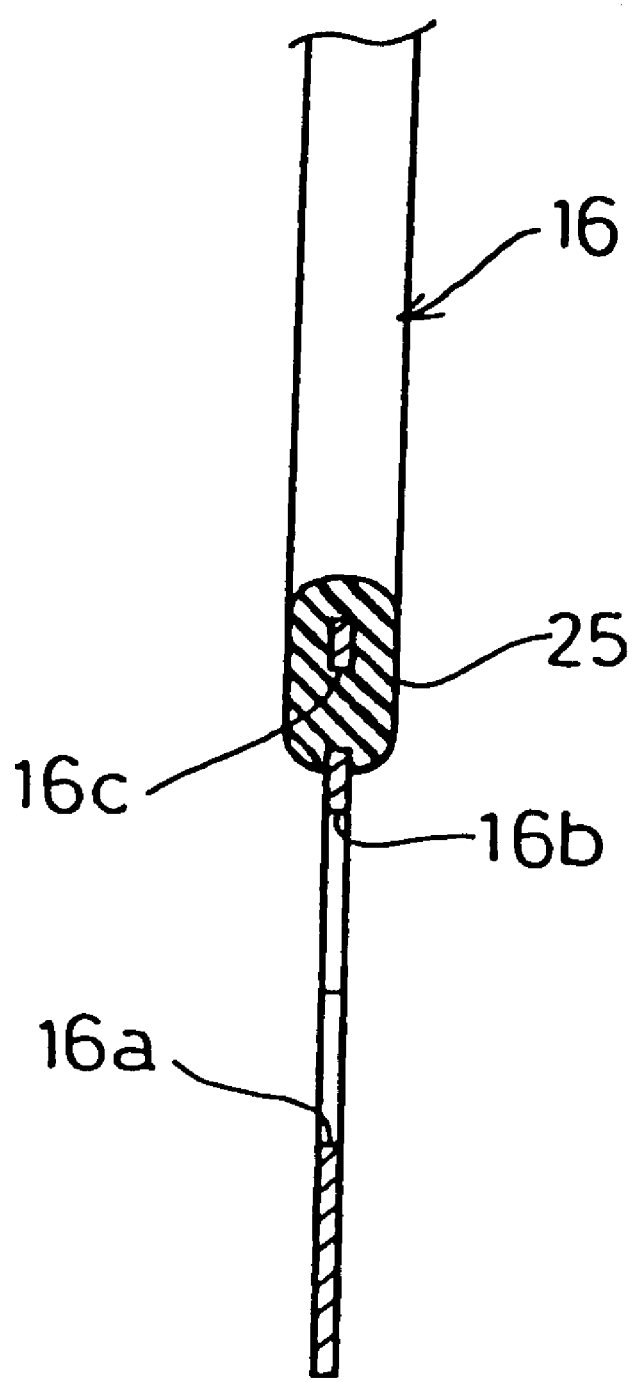
FIG. 5 is a partially enlarged view showing a portion V of FIG. 4.

Further, the flat spring 16 preferably has a hole formed in the center of the flat spring 16. An elastic member 25 may be disposed along the edge of the hole, for example, by insert molding, The elastic member 25 may contact both the front surface and back surface of the flat spring 16 so as to cover the peripheral edge portion of the hole. The inner circumferential portion of the flat spring 16 preferably has several (six in FIG. 3) holes 16c at equal intervals. The front surface and back surface of the elastic member are in communication via the holes 16c. FIG. 5 is a partially enlarged view showing the portion V of FIG. 4.

As discussed above, the elastic member 25 is preferably formed of an elastic material having excellent low temperature characteristics, such as a perfluorobased rubber, a perfluoroether-based rubber, a fluoro-sificone rubber, a hydrogenated NBR (nitril-butadiene rubber) or similar materials.

As shown in FIG. 3, the inner diameter D1 of the hole 25a in the elastic member 25 is smaller than the outer diameter D2 of the main portion 14a (see FIG. 2) of the movable valve 14. As a result, the elastic member has a fitting allowance T with respect to the valve portion 14c of the movable valve 14. If the valve portion 14c of the movable valve 14 is inserted into the hole 25a of the elastic member 25, as shown in FIG. 2, the movable valve 14 is tightly attached to the elastic member 25 as a result of the fitting allowance T (see FIG. 3). In this case, the elastic member 25 contacts the flange portion 14b of the movable valve 14.

As described above, the outer edge portion of the flat spring 16 is held between the collar 12 and the ring 18. Therefore, the movable valve 14 is supported by the flat spring 16 so as to open and close in an axial on (right and left directions in FIGS. 1 and 2). The movable valve 14 opens the fuel injection port 21 (valve opening) by retreating from a position that closes the fuel injection port 21 (moving to the right direction in FIGS. 1 and 2). Similarly, the movable valve 14 closes the fuel injection port 21 (valve closing) by returning to the position that closes the fuel injection port 21 (moving to the left direction in FIG. 1). In this case, the valve portion 14c of the movable valve 14 facially contacts the bearing surface 22 of the seat 20 at the position where the movable valve 14 closes the fuel injection port 21. Moreover, the abutting surface 14f of the flange portion 14b of the movable valve 14 facially contacts the stopper 10 at the position where the movable valve 14 opens the fuel injection port 21. The movable valve 14 is usually biased toward the position that closes the fuel injection port 21 by the elastic force of a coil spring 26, which will be described below.

As shown in FIGS. 1 and 2, a coil spring 26 is inserted into the core 2 from the rear side, and a spring load adjusting pipe 27 is then inserted into the core 2. A distal end face of the coil spring 26 contacts the spring bearing surface 14e of the movable valve 14 (see FIG. 2) On the other hand, a back end face of the coil spring 26 contacts a distal end ace of the pipe 27. The coil spring 26 biases the movable valve 14 toward the valve closing direction. The pipe 27 adjusts the spring insertion position and thus, the spring load of the coil spring with respect to the movable valve 14, and thereafter, may be fixed to the core 2, for example, by caulking.

A fuel passage 29 extends from the rear end face (right end face in FIG. 1) of the core 2 to the distal end face (left end face in FIG. 1) of the seat 20 and includes, for example, the core 2, the hollow portion of the core 2 and the pipe 27, the hollow portion 14d and the hole or passage 14k formed in the movable valve 14 and the fuel injection port 21 of the seat 20. A strainer 30 optionally may be disposed within the rear end portion of the core 2.

Moreover, the core 2 preferably has a concave groove (not numbed) in the outer periphery of the rear end portion and an O-ring 31 can be fitted into the recessed groove. The O-ring 31 preferably seals the space between the core 2 and a fuel delivery pipe (not shown) that communicates with the core 2. A grommet 32 can be fitted onto the core 2 and preferably contacts the rear end face of the connector 8 The grommet 32 may perform a buffer function between the connector 8 and the delivery pipe (not shown).

A representative example of the operation of the electromagnetic fuel injection valve of FIG. 1 will now be described Fuel is supplied from a fuel tank (not shown) via a pressure regulator (not shown), and is then filtered by the strainer 30. The filtered fuel passes through the fuel passage 29, and is then supplied to a space where the seat 20 and the movable valve 14 contact each other. At this time, the movable valve 14 is maintained in the valve closing position by the elastic force of the flat spring 16 and the coil spring 26; therefore, the fuel is not injected into the engine.

When the electronic control unit supplies electric power to the solenoid coil 4, a magnetic circuit M is formed (as shown by the dotted line M in FIG. 1), thereby causing the movable valve 14 to retreat (is moved to the right direction in FIG. 1 and FIG. 2) as a result of the electromagnetic attraction force. Thus, the fuel injection port 21 is opened. When the movable valve 14 is moved so that the fuel injection port 21 is opened, fuel is injected from the fuel injection port 21 into the engine.

When the electronic control unit cuts off the power supply to the solenoid coil 4, no electromagnetic attraction force acts on the movable valve 14. As a result, the movable valve 14 advance (is moved to the left direction in FIGS. 1 and 2) as a result of the force from the flat spring 16 and the coil spring 26, and thus, the fuel injection port 21 is closed. When the movable valve 14 is moved so that the fuel injection port 21 is closed, fuel injection from the fuel injection port 21 is stopped.

In the fuel injection valve of his embodiment, the elastic member 25 is interposed between the movable valve 14 and the flat spring 16; therefore, metallic contact is avoided between the movable valve 14 and the flat spring 16. Thus, it is possible to reduce or prevent wear of the movable valve 14 and/or the flat spring 16. Moreover, by elastically deforming the elastic member 25 can reduce the amount of stress applied to the flat spring 16 by the movable valve 14. Therefore, the likelihood of the flat spring 16 being broken is reduced or prevented and the durability of the fuel injection valve can be improved Moreover, if the movable valve 14 has been attached to the hole 25a of the elastic member 25 by interference fit caused by the elastic deformation of the elastic member 25, the movable valve 14 can be easily attached to the flat spring 16.

If the elastic member 25 comprises an elastic material having excellent low temperature characteristics as described above, it is possible to reduce or prevent the possibility that the elastic member will harden in low temperature environments, thereby further serving to reduce or prevent the possibility of breakage of the flat spring 16 in low temperatures. More specifically, if the elastic member 25 hardens as a result of low temperature, stress on the flat spring 16 will increase and the flat spring 16 can be easily broken. To the contrary, if the elastic member 25 is formed of an elastic material having excellent low temperature characteristics, it is possible to reduce or prevent the possibility of the elastic member 25 from hardening in low temperatures. Thus, it is possible to reduce the stress that is applied to the flat spring 16, and to reduce or prevent the possibility of breakage of the flat spring 16 in low temperatures.

If the flat spring 16 is formed of a material having fatigue-resistant characteristics, it is possible to improve the durability of the flat spring 16, which will serve to reduce or prevent the possibility of breakage of the flat spring 16. If the flat spring 16 is formed of SUS631 or SUS632J1, which are precipitation hardened stainless steels having fatigue-resistant characteristics, it is possible to reduce or prevent the possibility of breakage of the flat spring 16 for an extended period of time, as compared to a flat spring 16 that is made of SUS301, which is an austenitic stainless steel.

Figure 6:
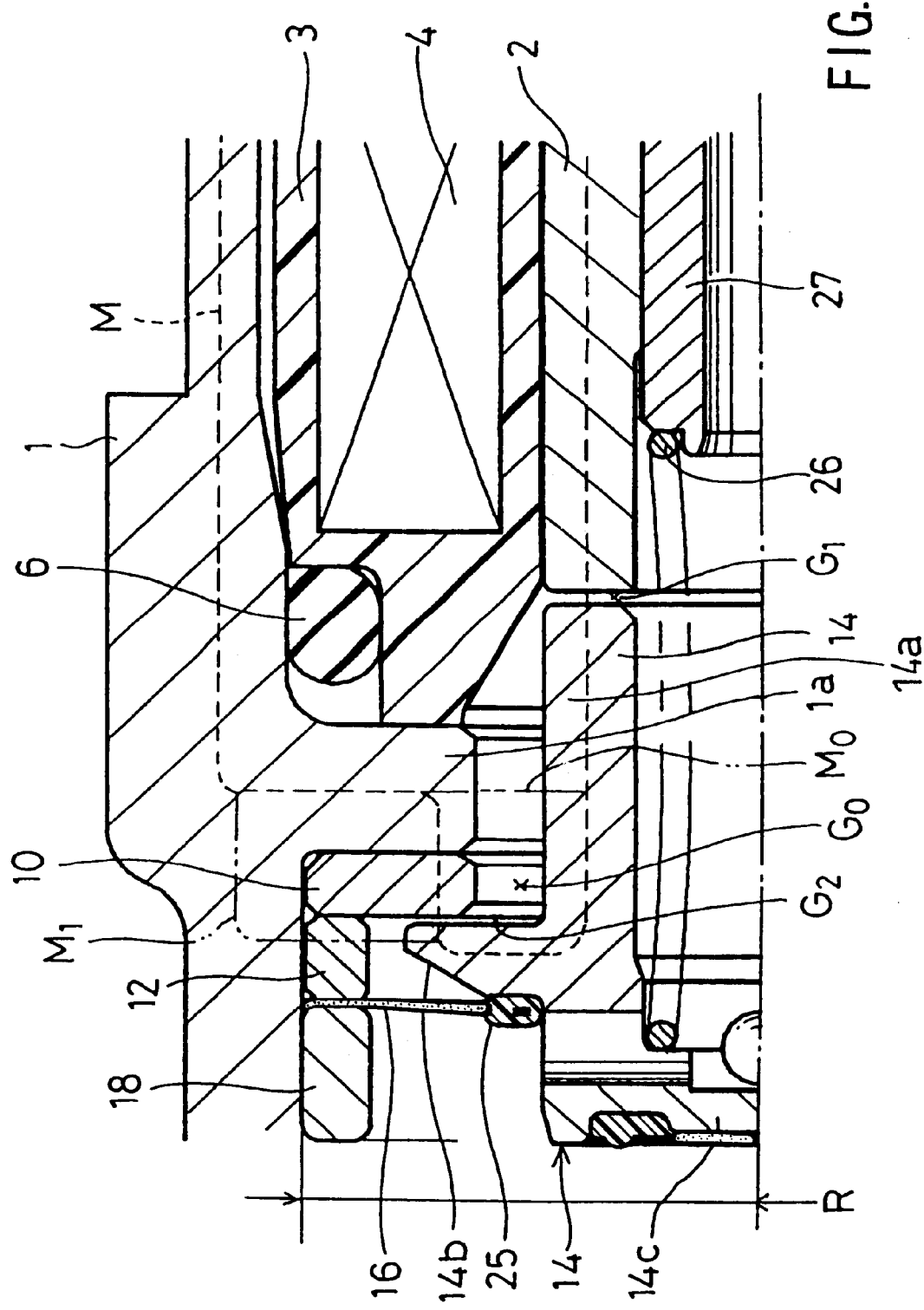
FIG. 6 is an enlarged view to explain principal parts of an air gap.

In the above described fuel injection valve, when electric power is supplied to the solenoid coil 4, the electromagnetic attraction force acting on the movable valve 14 may preferably be generated by a magnetic circuit M having two air gaps. More specifically, as shown in FIG. 6, the magnetic circuit M has two air gaps G1 and G2. Air gap G1 is formed between the core 2, around which the solenoid coil 4 is wound, and the main portion 14a of the movable valve 14. The core 2 may be a "first magnetic circuit forming member" as used in the remainder of the specification and claims. Air gap G2 is formed between the stopper 10 and the flange portion 14b of the movable valve 14. The stopper 10 may be a "second magnetic circuit forming member" as utilized in the remainder of the specification and claims.

In addition, an air gap G0 may be formed in a direction crossing the magnetic circuit M between the stopper 10, the flange portion 1a of the body 1 and the main portion 14a of the moving valve 14.

Figure 7:
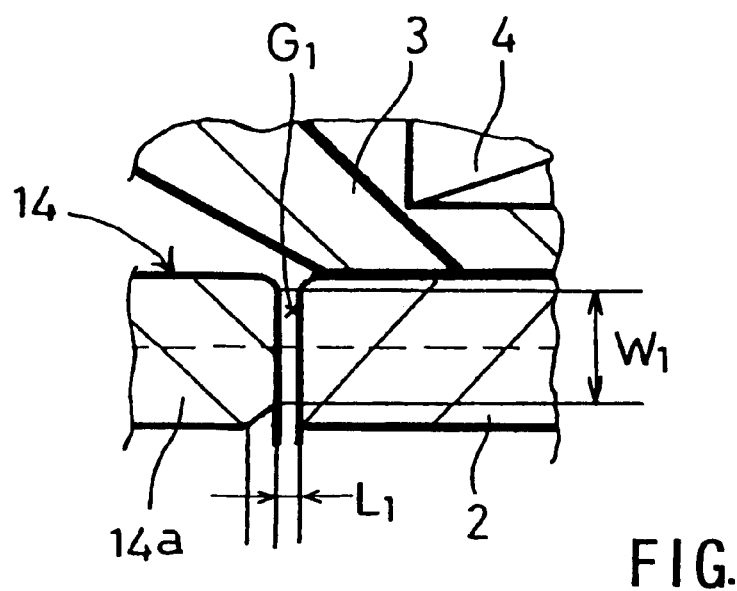
FIG. 7 is a view showing a peripheral portion of an air gap G1.

FIG. 7 shows air gap G1. The distance between the facing surfaces of the core 2 and the movable valve 14 is defined as L1 and the crosssectional facing width of the core 2 and the moveable valve 14 (which cross-sectional facing width excludes the chamfered and rounded surfaces) is defined as W1. A substantially doughnut-shaped area of the cylindrical core 2 and moveable valve 14, which has the cross sectional facing width W1, is defined as facing area S1 (not shown) of the facing surfaces of the core 2 and the main portion 14a of the movable valve 14. In this case, the permeance P1 of the air gap G1 is expressed by the following equation:

$$P1=(\mu 1 \cdot S1)/L1$$

wherein $\mu 1$ is the permeability of air gap G1 and the facing distance L1 is the distance between the core 2 and the moveable valve 14 when the movable valve 14 is in the valve closing position.

Figure 8:
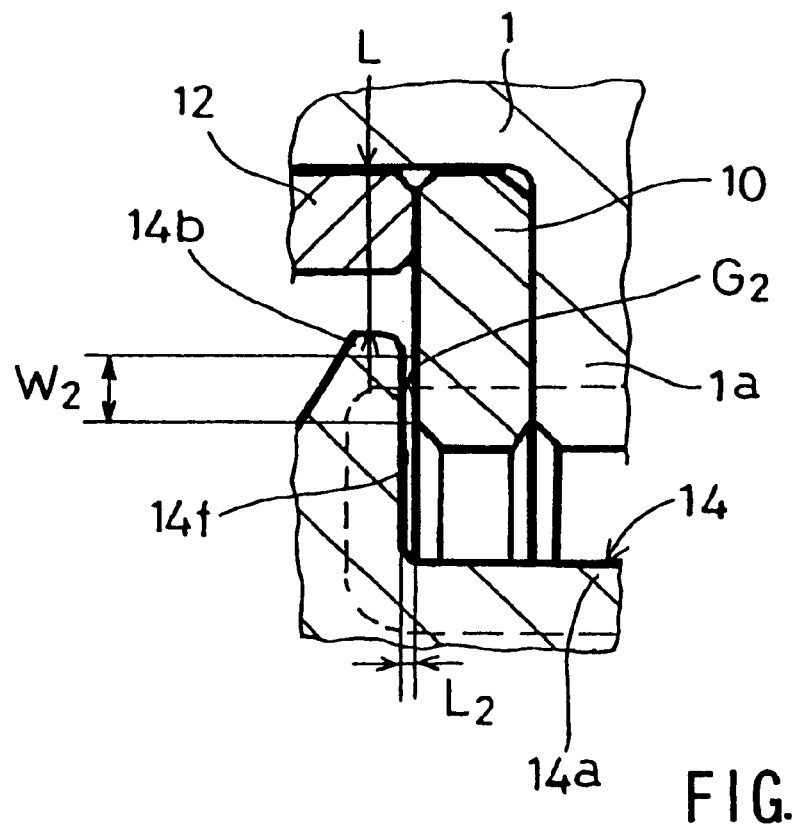
FIG. 8 is a view showing a peripheral portion of an air gap G2.

FIG. 8 shows air gap G2. The distance between the facing surfaces of the stopper 10 and the flange portion 14b of the movable valve 14 is defined as l2 and the cross-sectional facing width of the stopper 10 and the flange portion 14b (which cross-sectional facing width excludes the chamfered and rounded surfaces) is defined as W2. A substantially doughnut-shaped area of the cylindrical stopper 10 and flange portion 14b, which has the crosssectional facing width W2, is defined as facing area S2 (not shown) of the facing surfaces of the stopper 10 and the flange portion 14b. In this case, the permeance P2 of air gap G2 is expressed by the following equation:

$$P2=(\mu 2 \cdot S2)/L2$$

wherein $\mu 2$ is the permeability of air gap G2 and the facing distance L2 is the distance between the core 2 and the moveable valve 14 when the movable valve 14 is in the valve closing position.

Figure 9:
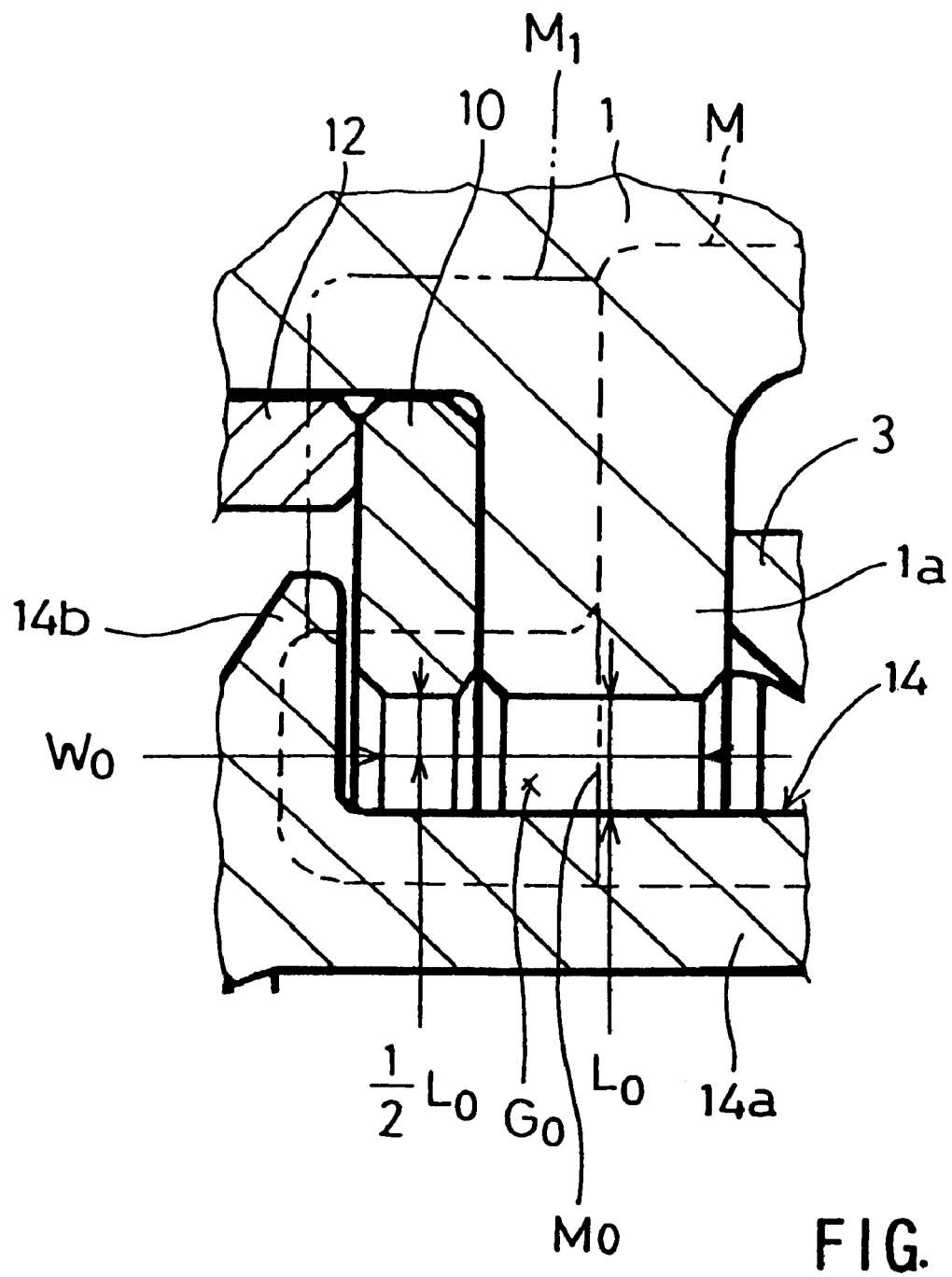
FIG. 9 is a view showing a peripheral portion of an air gap G0.

FIG. 9 shows air gap G0. The distance between the surfaces of the stopper 10 and the flange portion 1a of the body 1 and the surface of the main portion 14a of the movable valve 14 is defined as L0. The axiay cross-sectional facing width (which cross-sectional facing width excludes the chamfered and rounded surfaces) is defined as W0. In this case, the diameter of the doughnut shape is calculated as an average diameter; therefore, the sectional facing area S0 is calculated based upon a width at a position in which the facing distance is ½·L0. A substantially cylindrical area having the sectional facing width W0 is equivalent to a facing area S0 (not shown) of the diametrical mutually facing surfaces of the stopper 10 and the flange portion 1a of the body 1 and the diametrical facing surface of the main portion 14a of the movable valve 14. In this case, the permeance P0 of air gap G0 is expressed by the following equation:

$$P0=(\mu 0 \cdot S0)/L0$$

wherein $\mu 0$ is the permeability of air gap G0.

According to these equations, as the facing area S2 of the facing surfaces of the stopper 10 and the flange portion 14e of the movable valve 14 in the air gap G2 increases, the permeance P2 also increases, thereby increasing the electromagnetic attraction force. However, in order to increase the facing area S2, the outer diameter of the flange portion 14b of the movable valve 14 may be increased or the inner diameter of the stopper 10 may be increased.

But, there are limitations on increasing the size of the fuel injection valve. In general, radius R (see FIG. 6) from the central axis of the body 1 to the inner peripheral surface thereof is approximately constant in a portion into which the stopper 10, the collar 12 and the like are fitted. For this reason, when the outer diameter of the flange portion 14b of the movable valve 14 is made too large, the diametrical facing distance L (see FIG. 8) between the body 1 and the flange portion 14b of the movable valve 14 becomes small. When the facing distance L becomes small, flux leakage M1 (see M1 shown by a two-dotted chain line MO in FIG. 6) becomes large and the electromagnetic attraction force decreases.

On the other hand, when the inner diameter of the stopper 10 is made too small, the facing distance L0 (see FIG. 9) in the air gap G0 becomes narrow. When the facing distance L0 becomes narrow, flux leakage M0 (see M0 shown by a two-dotted chain line M1 in FIG. 6) becomes large and the electromagnetic attraction force decreases.

If the facing distance L0 of the air gap G0 is made long, the flux leakage M0 becomes small. In this case, the magnetic flux flowing through air gaps G0 and G2 becomes large. When the magnetic flux flowing through the air gaps G0 and G2 becomes large, the permeances P1 and P2 becomes large; therefore, the electromagnetic attraction force increases. However, when the facing distance L0 is made too long, the facing area S2 in the air gap G2 becomes smaller than an optimal value. Therefore, when the facing area S2 in the air gap G2 is increased, the facing distance L0 or the facing distance L becomes narrow. For this reason, the flux leakage M1 becomes large and the electromagnetic attraction force decreases.

In order to solve the above problem, samples were prepared having different permeance values P1, P2 and P0, while maintaining the diametrical facing distance L (see FIG. 8) between the body 1 and the flange portion 14b of the movable valve 14 as a constant Various facing distances L1, L2 and L0 and sectional facing widths W1, W2 and W0 were selected and the valve operating voltage was recorded.

Figure 10:
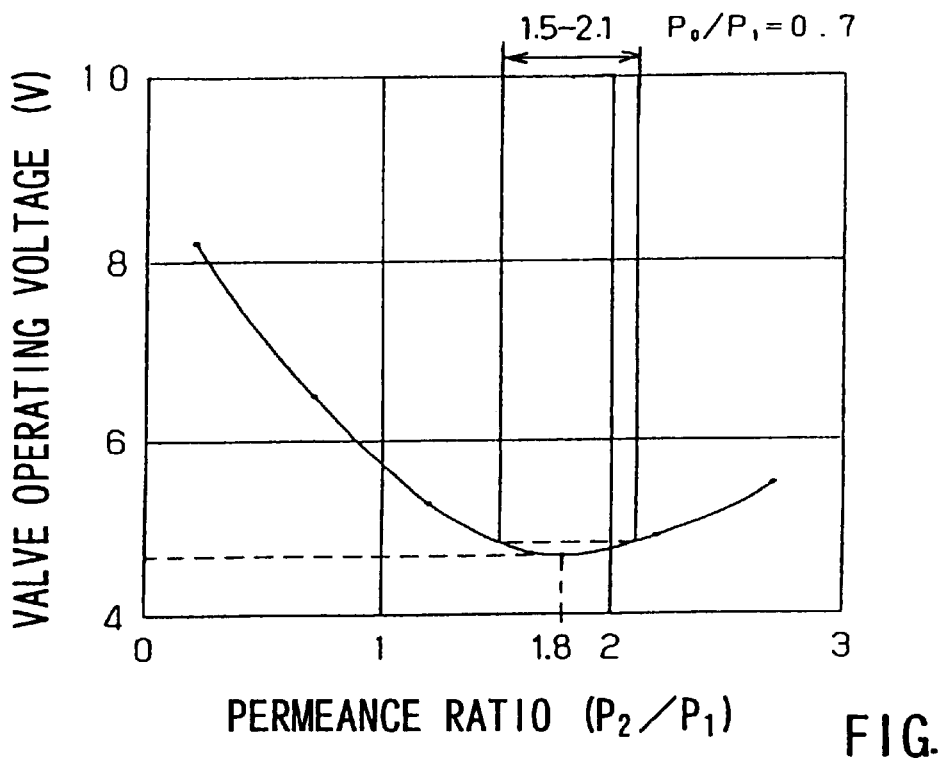
FIG. 10 is a characteristic diagram showing a relationship between a permeance ratio (P2/P1) and a valve operating voltage.

Based on these measurements, a characteristic diagram (see FIG. 10) was prepared that shows how the valve operating voltage changes with respect to a permeance ratio P2 P1), which is calculated by dividing the permeance P2 of air gap G2 by the permeance P1 of air gap G1. In FIG. 10, the abscissa shows the permeance ratio (P2/P1) and the ordinate shows the valve operating voltage. In the experiments, the permeance ratio (P0/P1), which is calculated by dividing the permeance P0 of air gap G0 by the permeance P1 of air gap G1, was set at 0.7 for each sample. As is evident from FIG. 10, the lowest valve operating voltages were obtained for permeance ratios (P2/P1) within the range of about 1.5 to about 2.1. In particular, if the permeance ratio (P2P1) is set to about 1.8 when the permeance ratio (P0/P1) is set to 0.7, the valve operating voltage is minimized.

In the above manner, the ratio (P2/P1) of the permeances P1 and P2 in the air gaps G1 and G2 is set to an optimal value, and thus, it is possible to improve the generation efficiency of electromagnetic attraction force while decreasing the valve operating voltage. Consequently, the fuel Section valve can be a miniaturized and the operating response of the movable valve 14 can be improved.

Figure 11:
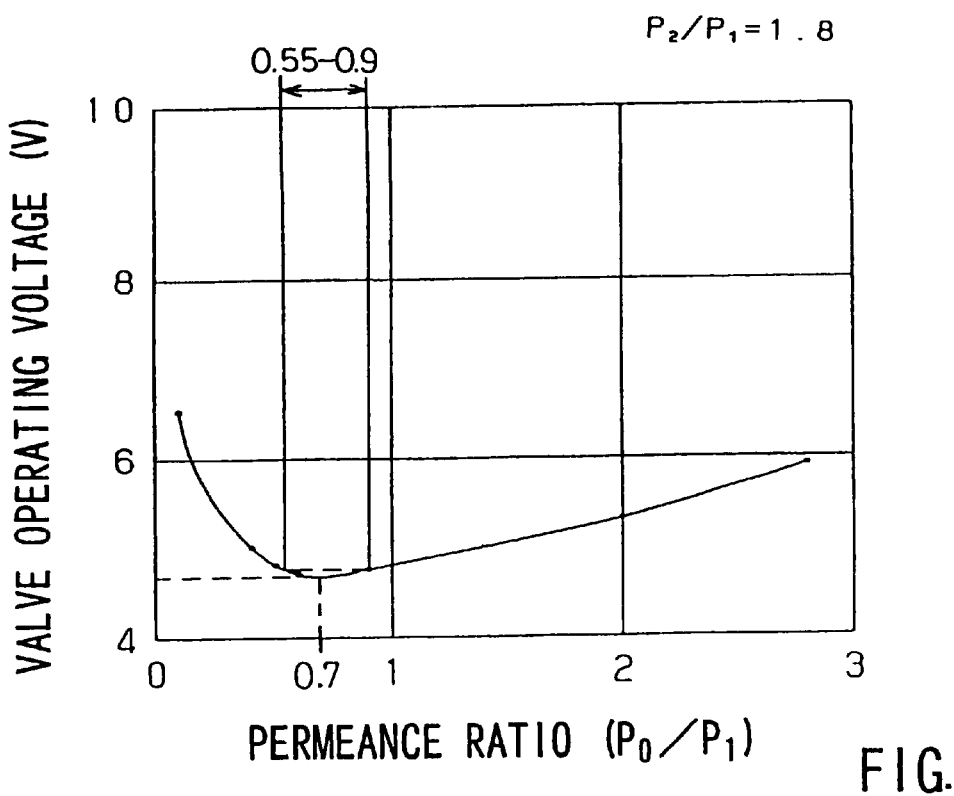
FIG. 11 is a characteristic diagram showing a relationship between a permeance ratio (P0/P1) and a valve operating voltage.

In addition, based on the above measurements, further experiments were conducted and a second characteristic diagram (see FIG. 11) was prepared that shows how the valve operating voltage changes with respect to the permeance ratio (P0/P1). In FIG. 11, the abscissa shows a permeance ratio (P0/P1) and the ordinate shows the valve operating voltage. In this experiment, the permeance ratio (P2/P1) was set at 1.8 for each of the samples. As is evident from FIG. 11, the lowest valve operating voltages were obtained for permeance ratios (P0/P1) within the range of about 0.55 to about 0.9. In particular, if the permeance ratio (P0/P1) is set to about 0.7 when the permeance ratio (P2/P1) is set to 1.8, the valve operating voltage is minimized.

In the manner as described above, the ratio (P0/P1) of the permeances P0 and P1 in the air gaps G0 and G1 is set to an optimal value, and thus, it is possible to improve the generation efficiency of electromagnetic attraction force while decreasing the valve operating voltage. Again, in such case, the fuel injection valve can be miniaturized and the operating response of the movable valve 14 can be improved.

In this representative embodiment, the movable valve 14 is supported by the flat spring 16, which further permits the valve operating voltage to be decreased. Thus, the present teachings are suitable for a small-size fuel injection valve that requires a high operating response of the movable valve 14.

Naturally, modifications of the representative embodiment can be made without departing from the spirit of the invention. For example, while the elastic member 25 preferably is disposed around the entire circumference of the flat spring 16, the elastic member 25 may be disposed in discrete positions around the inner circumference. Further, while the elastic member 25 preferably is attached to the flat spring 16, the elastic member 25 may instead be attached to the movable valve 14. Furthermore, while the movable valve 14 preferably is an integral molding product having the main portion 14a, the flange portion 14b and the valve portion 14c, these portions 14a, 14b and 14c may be molded independently from each other, and then, these components may be combined and assembled into the movable valve 14.

Although the above representative embodiment is a fuel injection valve that is preferably for use with compressed natural gas, the present teachings are also applicable to a fuel injection valve using a liquid fuel, such as gasoline and liquefied gas. Moreover, while the above embodiment is a top feed type fuel injection valve, a side feed type fuel injection valve may be used with the present teachings. Moreover, although the representative embodiment is a normally closed type fuel injection valve, it may also be a normally open type fuel injection valve.

What is claimed is:

1. A fuel injection valve comprising:
   a movable valve for opening and closing a fuel injection port;
   a flat spring for supporting the movable valve; and
   an elastic member interposed between the movable valve and the flat spring.

2. The fuel injection valve according to claim 1, wherein the elastic member is attached to one of the movable valve and the flat spring, and the other of the movable valve and the flat spring is attached to the elastic member.

3. The fuel injection valve according to claim 2, wherein the elastic member is attached to the entire circumference of one of the movable valve and the flat spring.

4. The fuel injection valve according to claim 3, wherein a first hole is defined within one of the movable valve and the flat spring and the elastic member is attached so as to cover an edge portion of the first hole.

5. The fuel injection valve according to claim 3, wherein the elastic member is attached to one of the movable valve and the flat spring by insert molding.

6. The fuel injection valve according to claim 4, wherein a second hole is defined within the elastic member, and the other of the movable valve and the flat spring is attached to the second hole of the elastic member by an interference fit.

7. The fuel injection valve according to claim 1, wherein the elastic member is formed of an elastic material having excellent low temperature characteristics.

8. The fuel injection valve according to claim 7, wherein the elastic member comprises an elastic material selected from the group consisting of perfluoro-based rubber, perfluoroether-based rubber, fluoro-silicone rubber and hydrogenated NBR.

9. The fuel infection valve according to claim 1, wherein flat spring comprises a material having excellent fatigue-resistant characteristics.

10. The fuel injection valve according to claim 9, wherein the flat spring comprises a precipitation hardened stainless steel.

11. A fuel injector comprising:
    a core having a hollow fuel passage,
    a movable valve disposed axially to the hollow fuel passage,
    a fuel port disposed axially to the movable valve,
    a flat spring disposed to bias the movable valve toward a valve closing position; and
    an elastic member interposed between the movable valve and the flat spring.

12. The fuel injector as in claim 11, wherein the elastic member is attached to one of the movable valve and the flat spring, and the other of the movable valve and the flat spring is attached to the elastic member.

13. The fuel injector as in claim 12, wherein the elastic member is attached to the entire circumference of the movable valve and the flat spring.

14. The fuel injector as in claim 13, wherein a first hole is defined within one of the movable valve and the flat spring, and the elastic member is attached so as to cover an edge portion of the first hole.

15. The fuel injector as in claim 14, wherein a second hole is defined within the elastic member, and the other of the movable valve and the flat spring is attached to the second hole of the elastic member by an interference fit.

16. The fuel injector as in claim 15, wherein the elastic member is formed of an elastic material having excellent low temperature characteristics.

17. The fuel injector as in claim 16, wherein the elastic member comprises an elastic material selected from the group consisting of perfluoro-based rubber, perfluoroether-based rubber, fluoro-silicone rubber and hydrogenated NBR.

18. The fuel injector as in claim 17, wherein the flat spring comprises a material having an excellent fatigue-resistant characteristics.

19. The fuel injector as in claim 18, wherein the flat spring comprises a precipitation hardened stainless steel.

* * * * *